US009375762B2

(12) United States Patent
Loussaert

(10) Patent No.: US 9,375,762 B2
(45) Date of Patent: Jun. 28, 2016

(54) GREASE PORT CLEANING TOOL

(71) Applicant: Steven A. Loussaert, Buckeye, AZ (US)

(72) Inventor: Steven A. Loussaert, Buckeye, AZ (US)

( * ) Notice: Subject to any disclaimer, the term of this patent is extended or adjusted under 35 U.S.C. 154(b) by 288 days.

(21) Appl. No.: 14/158,072

(22) Filed: Jan. 17, 2014

(65) Prior Publication Data

US 2014/0130830 A1 May 15, 2014

Related U.S. Application Data

(63) Continuation of application No. 11/844,646, filed on Aug. 24, 2007, now abandoned.

(51) Int. Cl.
| B08B 9/032 | (2006.01) |
| B08B 3/02 | (2006.01) |
| B08B 9/00 | (2006.01) |
| F16N 9/00 | (2006.01) |

(52) U.S. Cl.
CPC . *B08B 3/026* (2013.01); *B08B 9/00* (2013.01); *F16N 9/00* (2013.01)

(58) Field of Classification Search
CPC ................................. F16N 33/00; B08B 3/026
USPC ........................................................ 184/105.2
See application file for complete search history.

(56) References Cited

U.S. PATENT DOCUMENTS

| 3,552,406 | A * | 1/1971 | Whaley ..................... F16N 7/30 |
| | | | 134/167 R |
| 6,035,969 | A * | 3/2000 | Pyle ........................... 184/105.3 |
| 6,494,347 | B1 * | 12/2002 | Yeh .............................. 222/262 |
| 6,883,687 | B2 * | 4/2005 | Chuang ........................ 222/389 |
| 7,241,723 | B2 * | 7/2007 | Zhang et al. ................. 508/180 |
| 2003/0079944 | A1 * | 5/2003 | Gillespie ........................ 184/80 |
| 2004/0112680 | A1 * | 6/2004 | Chou ......................... 184/105.2 |
| 2004/0129498 | A1 * | 7/2004 | Pujol ........................... 184/6.14 |
| 2004/0200670 | A1 * | 10/2004 | Jakob et al. ................. 184/55.1 |

OTHER PUBLICATIONS

Wikipedia entry on WD-40, dated Mar. 15, 2005.*

* cited by examiner

*Primary Examiner* — William E Dondero
*Assistant Examiner* — Robert T Reese
(74) *Attorney, Agent, or Firm* — Robert A. Parsons; Michael W. Goltry; Parsons & Goltry

(57) ABSTRACT

A grease port cleaning tool includes a grease gun having an actuator, a cleaning fluid inlet, a pressure inlet and a pressurized cleaning fluid outlet. A reservoir of cleaning fluid is coupled to the cleaning fluid inlet and a pressure source is coupled to the pressure inlet. A coupler is coupled to the fluid outlet of the grease gun. The coupler is constructed to conduct pressurized cleaning fluid from the fluid outlet into a grease port in response to operation of the actuator.

14 Claims, 4 Drawing Sheets

GREASE PORT CLEANING TOOL

CROSS-REFERENCE TO RELATED APPLICATIONS

This application is a continuation application of currently pending U.S. application Ser. No. 11/844,646, filed 24 Aug. 2007.

This application claims the benefit of U.S. Provisional Application No. 60/840,238, filed 25 Aug. 2006.

FIELD OF THE INVENTION

This invention generally relates to apparatus for cleaning grease ports and more specifically to a tool for injecting cleaning fluid into grease ports.

BACKGROUND OF THE INVENTION

Grease for lubrication is ordinarily injected into machinery through grease fittings or portals called grease zerks. A grease gun injects the grease under pressure through a nozzle that incorporates a coupler dimensioned to mate with the zerk. Grease gun pressure may be pneumatic, hydraulic, manual, or electro-mechanical in a variety of known designs.

A problem with multiple applications of grease to a part of a machine is that dirty or contaminated grease builds up at the zerk and may restrict the flow or even block entry of the injected grease. Common solutions for the problem include forcing grease into the zerk under very high pressure to push the blockage away, inserting a thin probe to break up the collected grease, or bathing the joint in a light oil to dissolve the blockage. All of the described solutions involve stopping the ordinary flow of grease applications and taking remedial steps.

It would be highly advantageous, therefore, to remedy the foregoing and other deficiencies inherent in the prior art.

Accordingly, it is an object of the present invention to provide a new and improved grease port cleaning tool.

It is another object of the present invention to provide a new and improved grease port cleaning tool approximating the configuration of a standard grease gun.

SUMMARY OF THE INVENTION

The above objects and others are realized in a grease port cleaning tool generally approximating a grease gun. The tool includes a reservoir of cleaning fluid and a pressure source. A coupler is designed to couple cleaning fluid under pressure into a grease port. A chamber includes or has associated therewith an actuator and is coupled to the reservoir and the pressure source. The chamber is designed and connected to receive cleaning fluid from the reservoir and supply the received cleaning fluid under pressure from the pressure source to the coupler in response to operation of the actuator.

The above objects and others are further realized in a specific embodiment of a grease port cleaning tool that includes a grease gun having an actuator, a cleaning fluid inlet, a pressure inlet and a pressurized cleaning fluid outlet. A reservoir of cleaning fluid is coupled to the cleaning fluid inlet and a pressure source is coupled to the pressure inlet. A coupler is coupled to the fluid outlet of the grease gun. The coupler is constructed to conduct pressurized cleaning fluid from the fluid outlet into a grease port in response to operation of the actuator.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
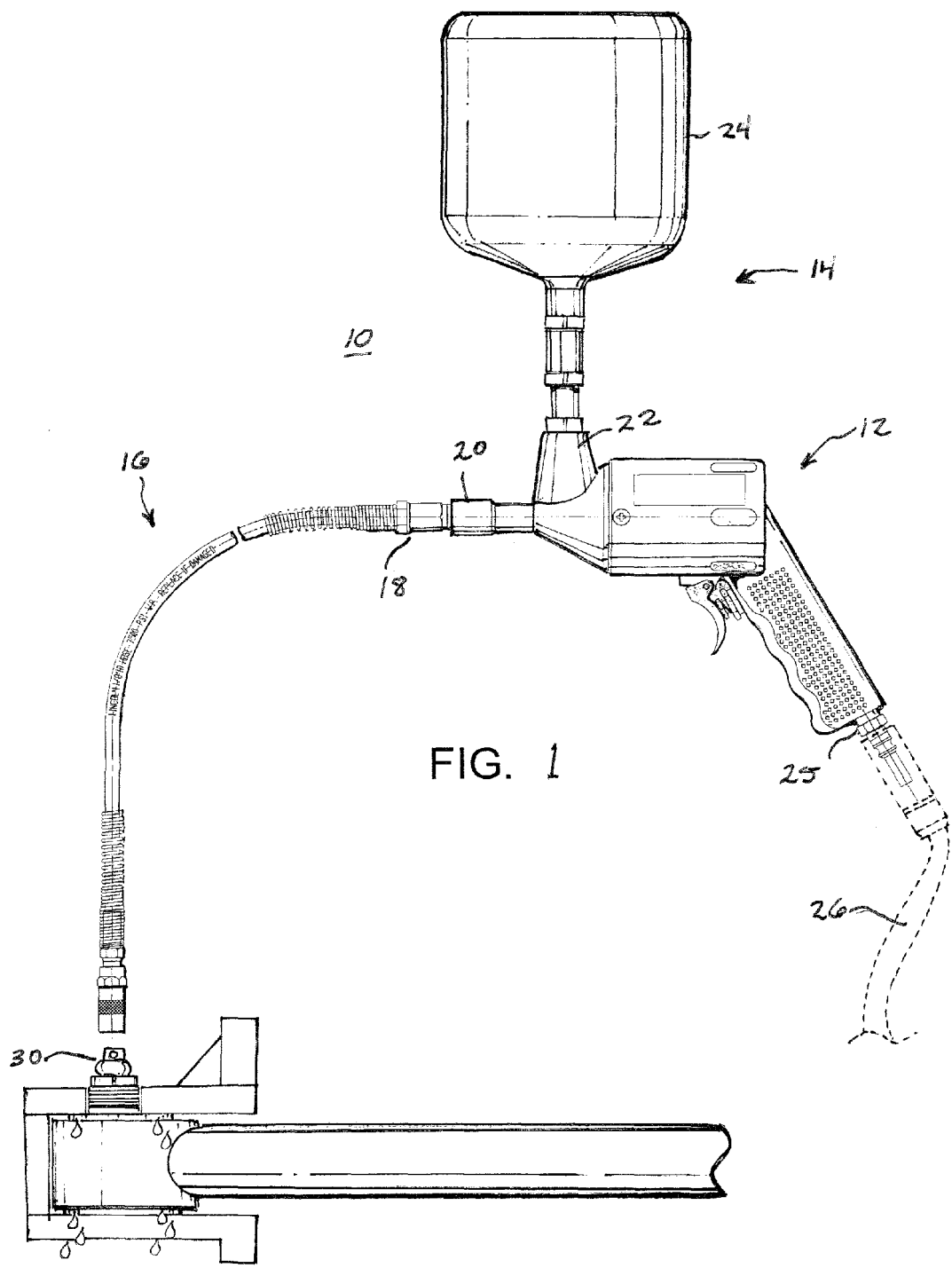
FIG. 1 is a side view of a grease gun with cleaning fluid attachment in accordance with the present invention.

Turning now to the drawings, attention is first directed to FIG. 1 which illustrates a grease port cleaning tool 10 including a pneumatic gun 12 incorporating a cleaning fluid delivery system 14 and a grease port connector 16. In the preferred embodiment, gun 12 has approximately the same configuration as a standard grease gun and may, in fact, be a modified grease gun. In this embodiment, an upwardly directed cleaning fluid inlet 22 of gun 12 is adapted to receive a reservoir 24 of cleaning fluid attached thereto. Reservoir 24 is positioned above gun 12 so that cleaning fluid contained therein is supplied to gun 12 under gravitational force to ensure a steady full supply. Cleaning fluid could be supplied to gun 12 using a variety of methods, as will be explained in more detail below. Also, a pressure source (not shown) is attached to a pressure inlet 25 of gun 12 by means of a hose 26 for activating gun 12 or driving material from an outlet 20 of gun 12. The pressure source in this example is pneumatic but it could be pneumatic, electrical, mechanical, or hydraulic, or even manual.

Grease port connector 16 has an inlet end 18 adapted to be connected to outlet 20 of gun 12. Primarily, grease port cleaning tool 10 is designed for injecting a cleaning substance into a clogged or restricted grease service port or grease zerk, designated 30 in FIG. 1. The cleaning substance can be any materials normally used, such as light oil, solvent, emulsifier, or other fluid. One example of such oil is sold under the trademark WD40. Because the cleaning substance used in the present system is much lighter or more fluid than the grease normally injected into the grease service ports, it is desirable to provide solid connections between gun 12, grease port connector 16, and grease service port 30 to reduce or eliminate leakage, as will be described in more detail below.

Figure 2:
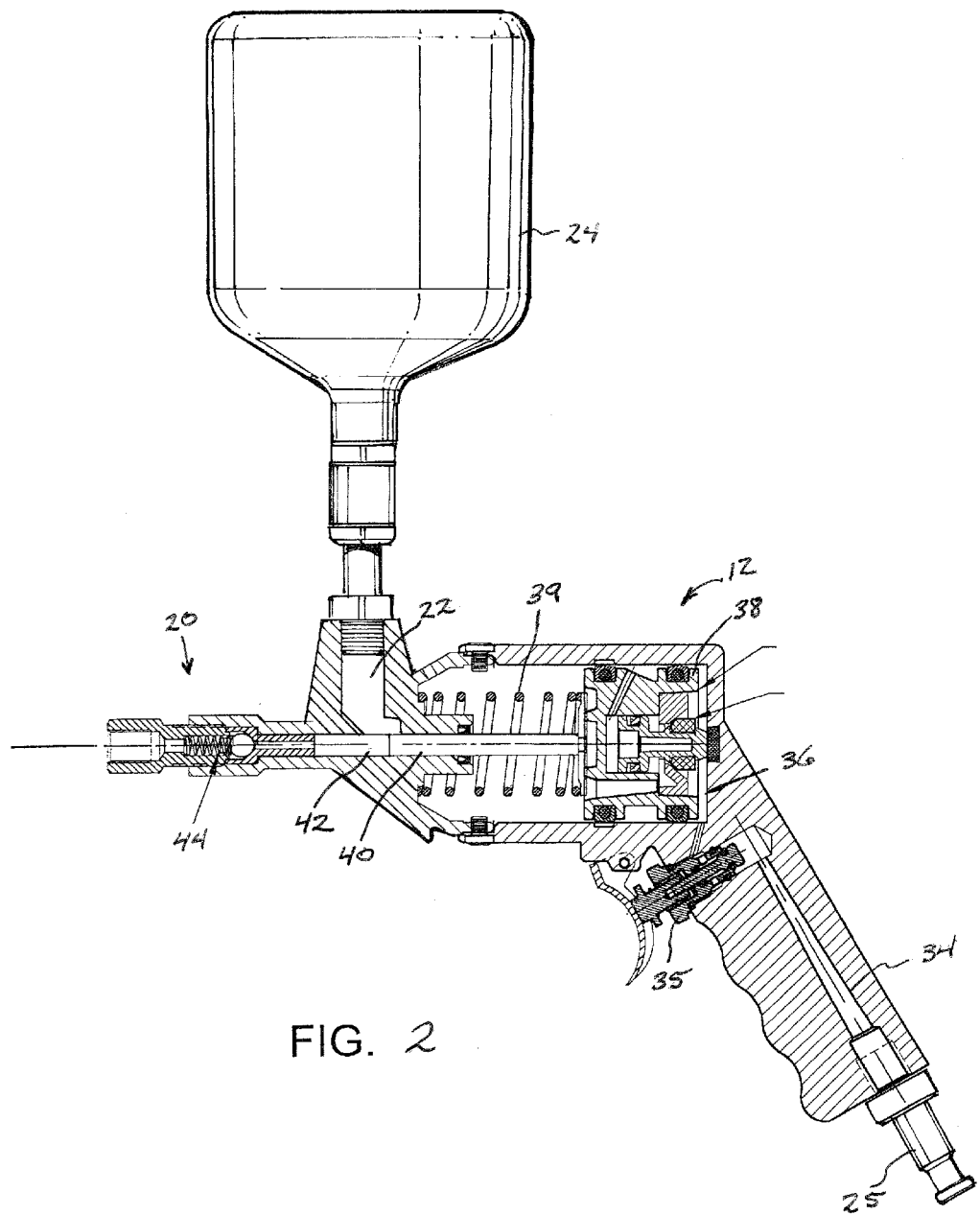
FIG. 2 is a sectional view illustrating the internal components of the grease gun of FIG. 1.

Referring additionally to FIG. 2, the inner components of gun 12 are illustrated. A pressure line 34 extends from pressure inlet 25 into communication with an activation or trigger assembly 35. When trigger 35 is depressed, pressure from line 34 is allowed to enter a chamber 36 between a rear wall of chamber 36 and a rear wall of a piston 38 mounted for reciprocal movement within chamber 36. A helical compression spring 39 is positioned between a front wall of piston 38 and the front wall of chamber 36. Spring 39 biases piston 38 toward the rear wall so that, with no pressure applied, piston 38 is in the position illustrated in FIG. 2. An elongated pusher rod 40 is coaxially affixed to the front wall of piston 38 and moves longitudinally in a tubular cavity 42 with movement of piston 38. Cleaning fluid inlet 22 is in fluid communication with tubular cavity 42 so that fluid entering cleaning fluid inlet 22 is conveyed by gravity directly into tubular cavity 42. Trigger assembly 35, in cooperation with piston 38 and pusher rod 40, is essentially an actuator that supplies the received cleaning fluid under pressure from the pressure source to the coupler in response to operation of the actuator. The entire assembly or any part that is operated to cause the response is considered within a definition of the actuator.

In this embodiment, for illustrative purposes, reservoir 24 is a bottle of cleaning fluid which is threadedly engaged in cleaning fluid inlet 22. It will be understood that other reservoirs or sources of cleaning fluid could be used and the term "reservoir" is intended to incorporate all such modifications. Also, reservoir 24 is threadedly engaged in cleaning fluid inlet 22 to reduce leakage during and between uses.

A one way ball valve 44 is positioned in outlet 20 of gun 12 to ensure that fluid cannot return from a blocked or restricted grease service port or grease zerk (e.g. grease zerk 30). Ball valve 44 may be included as a part of outlet 20 or it may be a component of grease port connector 16. In either case, one way ball valve 44 is press fit, threadedly engaged, or otherwise leak resistantly engaged in the end of gun 12 in fluid communication with tubular cavity 42. An inlet end of grease port connector 16 is threadedly engaged in the outlet end of ball valve 44. The outlet end of grease port connector 16 is adapted to be connected to a grease port, such as zerk 30.

Thus, with reservoir 24 in place and containing a supply of cleaning fluid and with hose 26 coupling gun 12 to a pressure source, to clean a grease port the operator simply connects the outlet of grease port connector 16 to the grease port or zerk to be cleaned. The operator then pulls trigger 35 which introduces pressure into chamber 36 so that piston 38 is forced forward in chamber 36 and pusher rod 40 forces fluid from tubular cavity 42 through grease port connector 16 and into the grease port. Each time the operator pulls trigger 35 cleaning fluid is forced under pressure into the grease port being cleaned.

Figure 3:
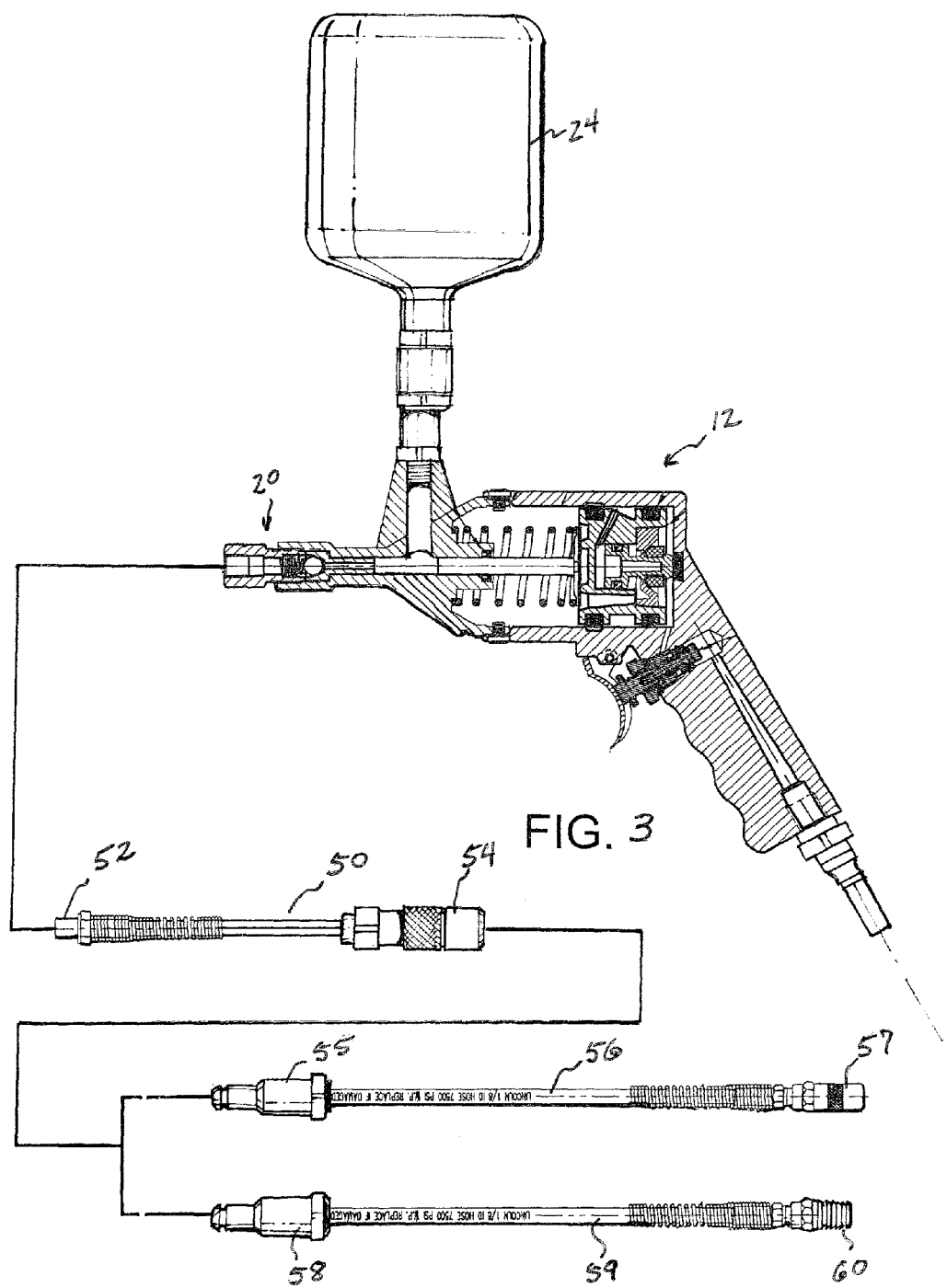
FIG. 3 is a semi-exploded view of the grease gun and connectors of FIG. 1, illustrating some connector modifications.

As is known in the field, many grease fittings allow extra grease (i.e. from a full grease port) to ooze out the sides of the port. In the case of cleaning fluid under relatively high pressure this is undesirable. Thus, in the preferred embodiment the outlet end of grease port connector 16 is designed to tightly engage the grease port. Referring additionally to FIG. 3, two different outlet ends are illustrated. To facilitate the change or adoption of either of the two different outlet ends grease port connector 16 includes a first or adapter component, designated 50. Component 50 has an inlet end 52 that, preferably, threads into the outlet 20 of gun 12. The opposite end of component 50 has one part 54 of a two part coupler attached thereto. A second part 55 of the two part coupler is affixed to one end of a flexible hose 56 (hereinafter component 56) with a standard zerk coupler 57 on the end thereof. A different outlet end is provided with a second part 58 (similar to part 55) of the two part coupler affixed to one end of a flexible hose 59 (hereinafter component 59) with a threaded coupler 60 on the end thereof.

Figure 6:
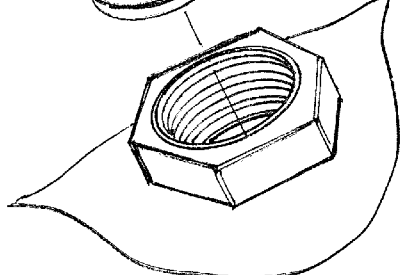
FIG. 6 is an enlarged prospective view illustrating a connection of the grease gun to a grease port.

In general, component 56 is relatively quick and easy to use. If a grease port is not too badly blocked this component can be used by simply engaging zerk coupler 57 with the zerk and applying cleaning fluid. If a grease port is so badly blocked that too much fluid escapes when using component 56, the operator can simply replace component 56 with component 59. The operator can then remove (unthread) the zerk fitting and thread coupler 60 of component 59 into the opening (see for example FIG. 6). The threaded engagement of coupler 60 insures that cleaning fluid under pressure is forced into the grease port to unblock and clean the port. Components 56 and 59 are quickly and easily alternated because of the two part coupling (54 and 55 or 58).

Figure 4:
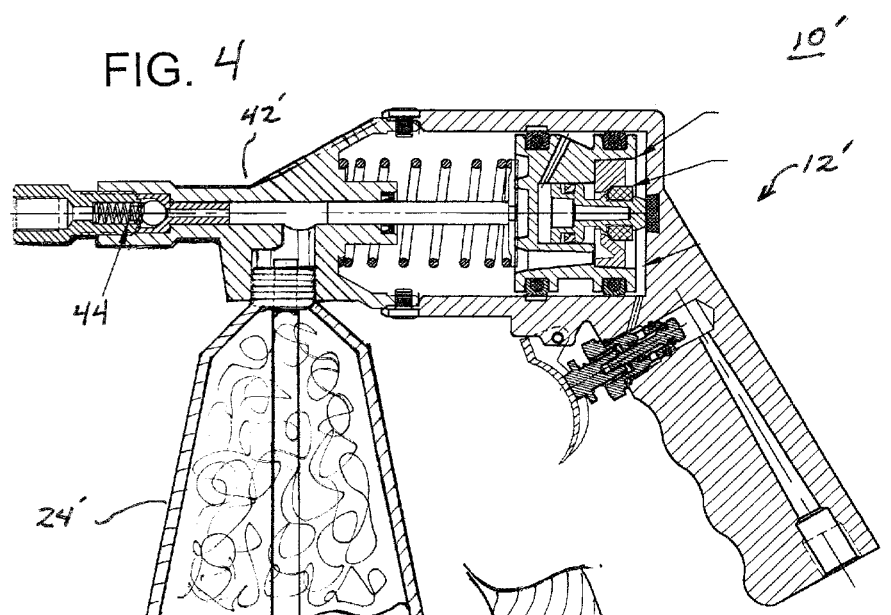
FIG. 4 is a sectional view, similar to FIG. 2, illustrating another embodiment.

Referring to FIG. 4, a slightly different embodiment of a grease port cleaning tool 10' is illustrated in which similar components are designated with similar numbers and a prime (') is added to indicate the different embodiment. In this embodiment reservoir 24' is positioned beneath gun 12' and a pressure hose 23' is coupled to the lower end to force cleaning fluid from reservoir 24' and into tubular cavity 42'. The rest of grease port cleaning tool 10' is the same as grease port cleaning tool 10 and operates substantially as described above.

Figure 5:
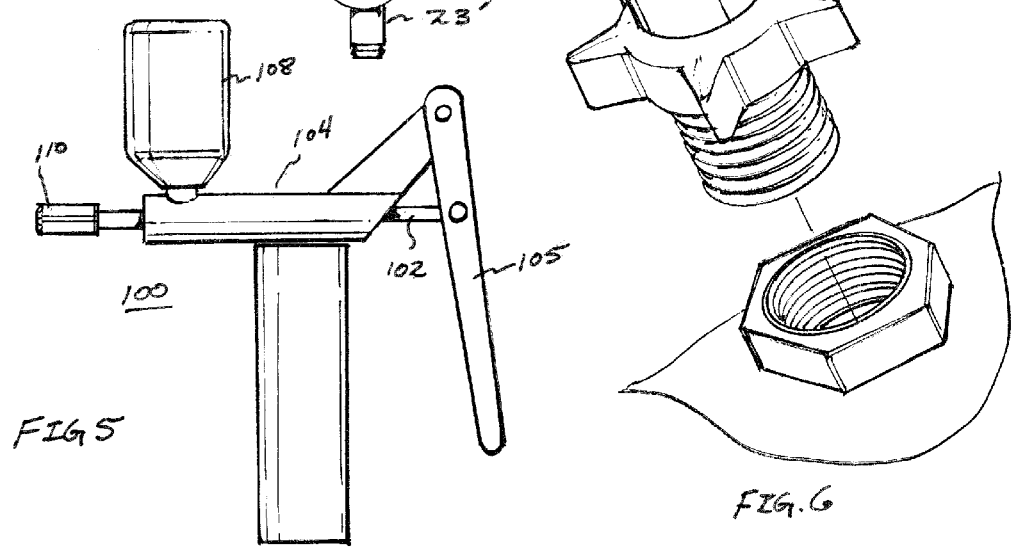
FIG. 5 is a side view of another embodiment of a grease gun with cleaning fluid attachment in accordance with the present invention.

Referring to FIG. 5, a manually operated simplified version of a grease port cleaning tool 100 is illustrated. In this embodiment a piston 102 (only a connecting rod is illustrated) is mounted for reciprocal movement within a cylinder 104 by operation of a handle 105. In operation, as handle 105 is drawn rearwardly, cleaning fluid is allowed to flow from reservoir 108 into cylinder 104. Handle 105 can then be pushed forward (manually) to force the cleaning fluid from cylinder 104 out through an outlet 110. Outlet 110 can either be connected directly to a grease port to be cleaned or it can be coupled through a grease port connector, such as connector 16 or the dual connectors illustrated in FIG. 3. In this embodiment the handle 105 coupled to the piston is considered to come within the definition of the actuator, as well as the source of pressure.

In any of the embodiments it is anticipated that an operator (i.e. a person greasing a machine) can, using their standard greasing equipment, simply proceed with the greasing operation. When a blocked or a restricted grease port is encountered, the operator simply replaces the standard grease gun with a grease port cleaning tool of the present invention. The grease port cleaning tool cleans the blocked or restricted grease port virtually instantly and the operator can then replace the grease port cleaning tool with the standard grease gun and proceed with the greasing operation. It will be understood by those of ordinary skill in the art that little time is lost (mere minutes) and the greasing operation quickly, easily, and efficiently proceeds.

Thus, a new and improved grease port cleaning tool has been disclosed that is convenient to install and use. Further, the new and improved grease port cleaning tool is relatively inexpensive to manufacture and to use. As will be understood from the above description of a normal operation, the closer the grease port cleaning tool approximates the configuration of a standard grease gun the easier and quicker the cleaning operation. Although in some specific applications a manually operated grease port cleaning tool may be advantageous.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A method of greasing a machine and cleaning blocked or restricted grease ports during the greasing operation, the method comprising the steps of:

providing a greasing grease gun coupled to a source of grease for the greasing operation and a pressure source;

providing a cleaning grease gun including an actuator, a cleaning fluid inlet, a pressure inlet and a pressurized cleaning fluid outlet, a reservoir of cleaning fluid coupled to the cleaning fluid inlet, the cleaning fluid being a non-grease fluid having a viscosity less than the viscosity of grease, a coupler coupled to the fluid outlet of the cleaning grease gun and constructed to conduct pressurized cleaning fluid from the fluid outlet into a grease fitting in response to operation of the actuator, the coupler being designed to tightly engage the grease fitting to reduce or eliminate pressurized cleaning fluid leakage between the coupler and grease fitting;

providing a cleaning grease gun reservoir including providing a bottle containing a non-grease fluid having a viscosity less than the viscosity of grease, mounting the bottle vertically on an upper surface of the grease gun in fluid communication with the cleaning fluid inlet, and employing gravity to feed the non-grease fluid into the cleaning fluid inlet;

performing the greasing operation using the greasing grease gun until a blocked or restricted grease fitting is encountered;

exchanging the greasing grease gun for the cleaning grease gun, attaching the pressure source to the cleaning grease gun and the coupler of the cleaning grease gun to the blocked or restricted grease fitting;

operating the actuator of the cleaning grease gun to inject cleaning fluid into the blocked or restricted grease fitting until the blocked or restricted grease fitting is a cleaned and unrestricted grease fitting;

disconnecting the coupler of the cleaning grease gun from the cleaned and unrestricted grease fitting; and exchanging the cleaning grease gun for the greasing grease gun attaching the pressure source to the greasing grease gun and continuing with the greasing operation.

2. A method as claimed in claim 1 wherein the step of providing a reservoir of cleaning fluid includes selecting the cleaning fluid from a group consisting of light oils, solvents, and emulsifiers.

3. A grease port cleaning tool comprising:
a reservoir of cleaning fluid, the cleaning fluid being a non-grease fluid having a viscosity less than the viscosity of grease;
a pressure source;
a coupler designed to couple cleaning fluid under pressure into a grease port, the coupler being designed to tightly engage the grease fitting to reduce or eliminate cleaning fluid leakage between the coupler and the grease fitting; and
a chamber including an actuator, the chamber being coupled to the reservoir, the pressure source, and the coupler, the chamber being designed and connected to receive cleaning fluid through a cleaning fluid inlet from the reservoir and supply the received cleaning fluid under pressure from the pressure source through a cleaning fluid outlet to the coupler in response to operation of the actuator; wherein the reservoir of cleaning fluid includes a bottle mounted vertically on an upper surface of the grease port cleaning tool in fluid communication with the chamber, and employing gravity to feed the non-grease fluid into the chamber.

4. A grease port cleaning tool as claimed in claim 3 wherein the source of pressure is one of pneumatic, electrical, mechanical, hydraulic, and manual.

5. A grease port cleaning tool as claimed in claim 3 wherein the pressure source includes a pneumatic hose.

6. A grease port cleaning tool as claimed in claim 3 wherein the actuator includes a trigger assembly designed to couple pressure from the pressure source into the chamber upon operation of the trigger assembly, an internal piston, and a pusher rod attached to the piston.

7. A grease port cleaning tool as claimed in claim 3 wherein the cleaning fluid outlet includes a one way ball valve designed to allow cleaning fluid to flow only from the chamber to the coupler.

8. A grease port cleaning tool as claimed in claim 3 wherein the coupler further includes a grease port connector, the grease port connector including a zerk coupler at a distal end constructed to attach to a zerk grease port.

9. A grease port cleaning tool as claimed in claim 3 wherein the coupler includes threads at the distal end designed to threadedly engage a grease port with a zerk removed therefrom.

10. A grease port greasing and cleaning assembly comprising:
a greasing grease gun including an actuator, a grease inlet, a pressure inlet and a pressurized grease outlet;
a cleaning grease gun including a chamber, an actuator and a reservoir of cleaning fluid coupled to the chamber, the cleaning fluid being a non-grease fluid having a viscosity less than the viscosity of grease, the reservoir of cleaning fluid includes a bottle mounted vertically on an upper surface of the cleaning grease gun and employing gravity to feed the low viscosity fluid into the chamber, a pressure inlet in communication with the chamber, a coupler coupled to a cleaning fluid outlet of the chamber, the coupler being designed to couple cleaning fluid under pressure into a grease fitting, the coupler being designed to tightly engage the grease fitting to reduce or eliminate cleaning fluid leakage between the coupler and the grease fitting;
the chamber of the cleaning grease gun being designed and connected to receive cleaning fluid through a cleaning fluid inlet from the reservoir and supply the received cleaning fluid under pressure from the pressure source through the cleaning fluid outlet to the coupler in response to operation of the actuator, and the cleaning fluid outlet including a one way ball valve designed to allow cleaning fluid to flow only from the chamber to the coupler; and
a pressure source designed to couple to either of the pressure inlet of the greasing grease gun or the pressure inlet of the cleaning grease gun.

11. A grease port greasing and cleaning assembly as claimed in claim 10 wherein the pressure source is pneumatic.

12. A grease port greasing and cleaning assembly as claimed in claim 10 wherein the actuator of the cleaning grease gun includes a trigger assembly, an internal piston, and a pusher rod.

13. A grease port greasing and cleaning assembly as claimed in claim 10 the coupler of the cleaning grease gun includes threads at a distal end designed to threadedly engage a grease port with a zerk removed therefrom.

14. A grease port greasing and cleaning assembly as claimed in claim 10 wherein the cleaning fluid in the reservoir of the cleaning fluid grease gun is selected from a group consisting of light oil, solvent, and emulsifiers.

* * * * *